United States Patent Office 2,994,765
Patented Aug. 1, 1961

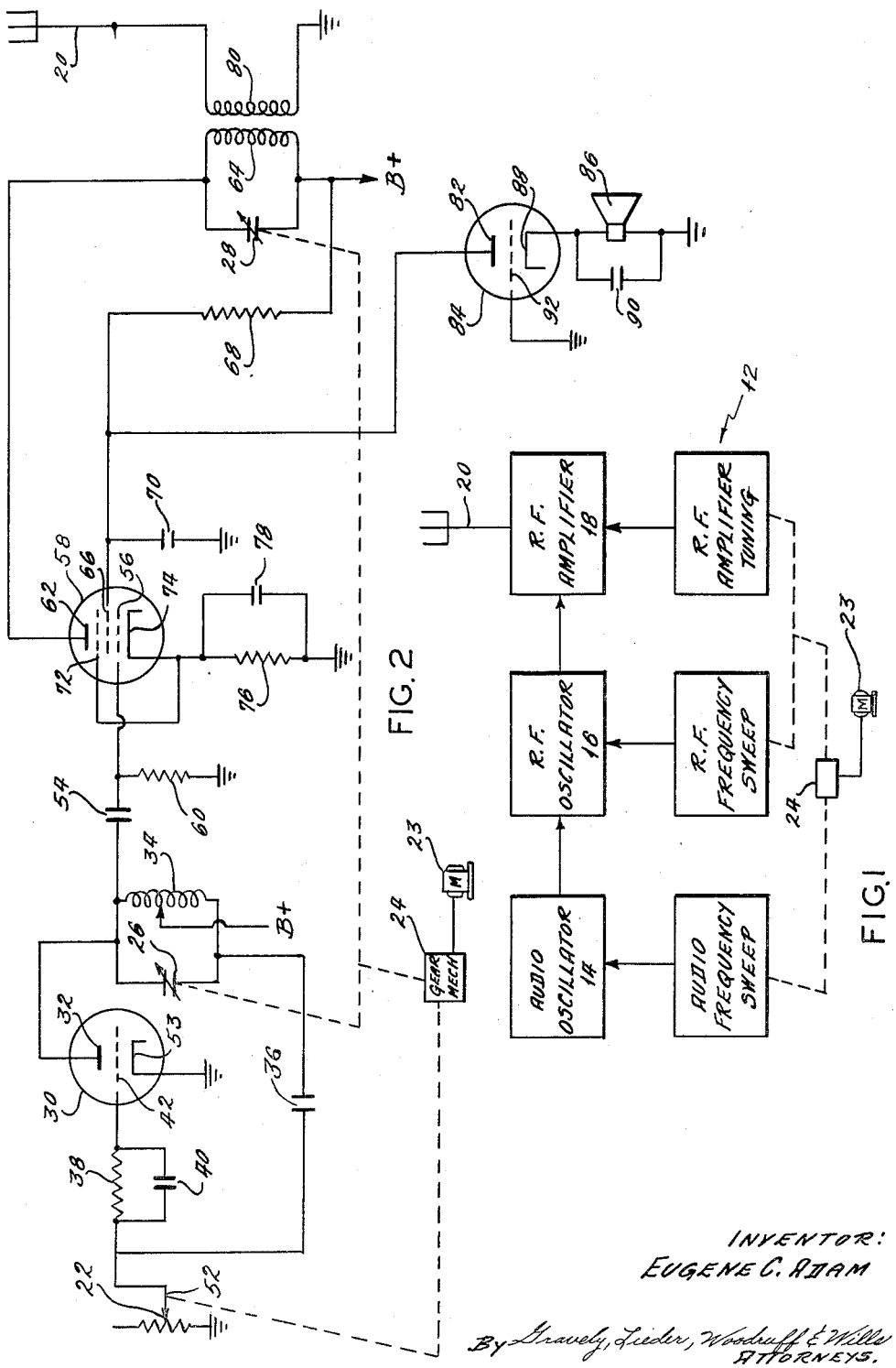

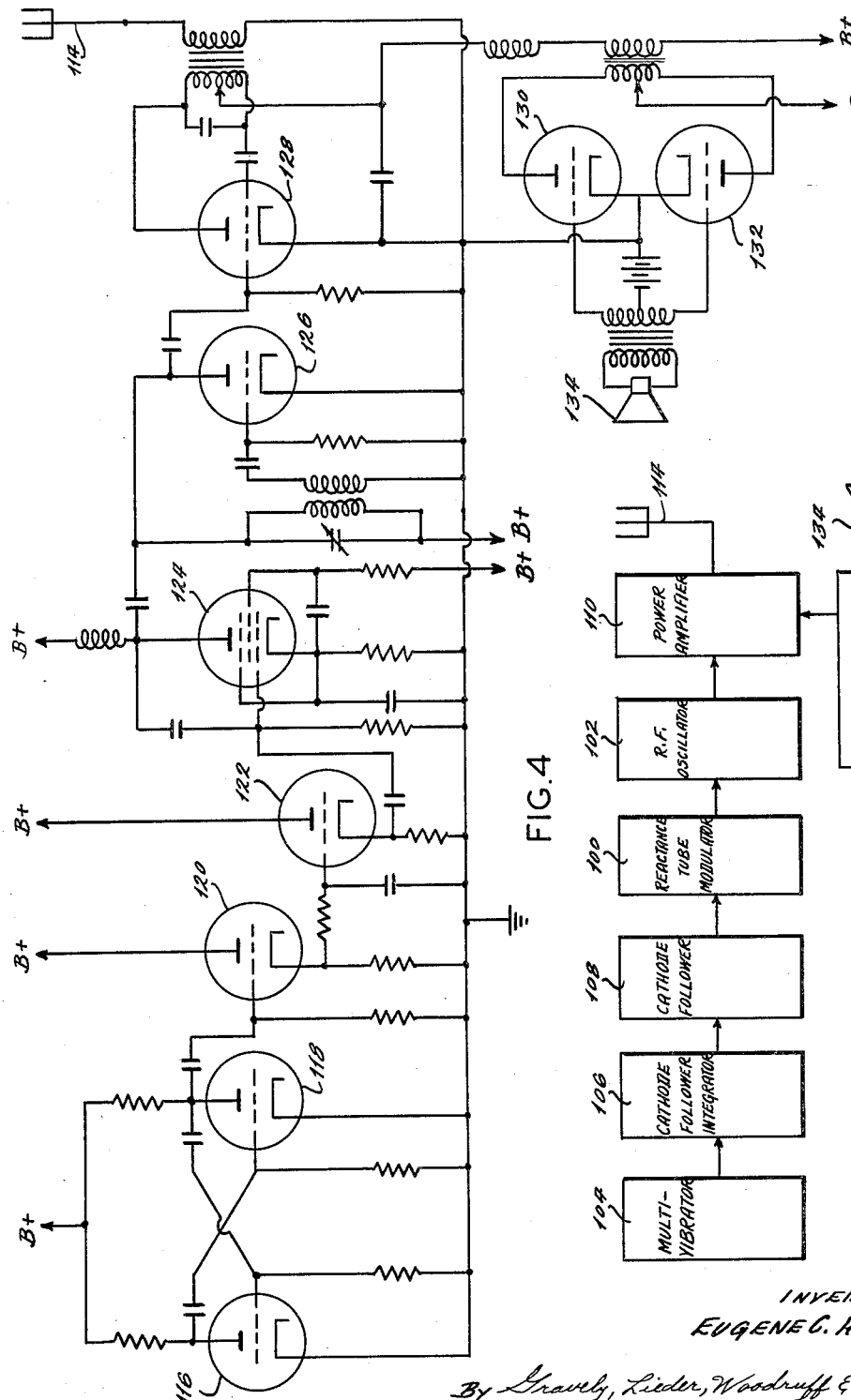

2,994,765
EMERGENCY VEHICLE ALARM DEVICE
Eugene C. Adam, 7412 Devonshire, Shrewsbury, Mo.
Filed Aug. 9, 1957, Ser. No. 677,309
3 Claims. (Cl. 250—2)

The present invention relates generally to warning devices and more particularly to an alarm device for use on emergency vehicles and the like that is employed to alert persons, and particularly persons whose attentions are otherwise preoccupied, to the presence of an emergency condition requiring greater than usual precaution.

Devices such as sirens, automatic stop-light control mechanisms, and so forth, have been devised heretofore for use on emergency vehicles to alert persons of an emergency condition. The known devices, however, are not always loud enough to be heard or quick enough acting to alert persons whose attentions are otherwise preoccupied as by listening to a radio, and therefore, they have not solved the problem of alerting these person to the emergency condition. The present invention overcomes these and other disadvantages of the known devices by providing an alarm device for emergency vehicles which will interfere with radio and other similar types of transmitted signals anywhere in a preselected frequency band and alert listeners of an emergency condition.

A principal object of the present invention is to provide a relatively inexpensive device for use on emergency vehicles and the like which will alert motorists and others preoccupied listening to radios and the like of an emergency condition.

Another object of the invention is to provide alarm means that will interfere with radio and other types of transmitted signals over the full broadcast or other frequency band to alert persons of an emergency condition.

Another object of the invention is to provide a device that reduces to a minimum the number of accidents involving emergency vehicles and particularly to minimize the number of accidents that result because of the inability of motorists to hear warning noises and the like above the noise of their car radios.

Another object of the invention is to provide an alarm device for emergency vehicles and the like which includes a minimum number of parts, is simple to operate, and requires a minimum of maintenance.

Another object of the invention is to provide a device that will alert a greater segment of the population to the presence of an emergency vehicle in the area regardless of surrounding noise conditions and weather conditions which might cause the closing of car windows.

Another object of the present invention is to provide an alarm device for emergency vehicles that interferes with radio and other transmitted signals in such manner as to indicate to the listeners the relative proximity, kind of emergency, and direction of movement of an emergency vehicle.

Another object is to equip emergency vehicles and the like with an alarm device capable of interfering with radio and like signals in a way that simulates a siren or other known alarm signal, or to convey a message.

Briefly, the present device comprises an electrical signal generator connected for transmitting a generated signal from an antenna, said generator having an element associated therewith capable of varying the frequency of the generated signal over a preselected frequency band, operator means operatively connected to the frequency varying element for moving said element and changing the frequency of the generated signal during operation of the device, and means for modulating the frequency varying signal at an audible rate.

These and other objects and advantages of the present device will become apparent after considering the following detailed specification in conjunction with the accompanying drawings, wherein:

FIG. 1 is block diagram of an alarm device for emergency vehicles and the like constructed according to the teachings of the present invention, FIG. 2 is a schematic wiring diagram of the same alarm device, FIG. 3 is a block diagram showing a modified form of the present device, and FIG. 4 is a schematic wiring diagram of the modified device of FIG. 3.

Referring to the drawings more particularly by reference numbers, number 12 in FIG. 1 refers to an alarm device constructed according to the teachings of the present invention. The device 12 is adapted to be mounted in the area of the dashboard of a vehicle such as a police car or ambulance although any other location on the vehicle would be equally suitable because the operation of the device 12 does not depend upon the attention of an operator.

The device 12 is basically a three stage transmitter consisting of a so called audio oscillator 14, a radio frequency (R.F.) oscillator 16, and a radio frequency (R.F.) amplifier 18. The output of the device 12 which is taken from the amplifier 18 is fed to an antenna 20 which preferably transmits in all directions but could, if desired, be made directional, as for example, to radiate primarily in a forward and/or rearward direction with minimum sidewise radiation or to radiate substantially all of its energy in one direction only.

All three stages of the transmitter are shown controlled mechanically to produce the desired output. The audio stage 14 which modulates or interrupts the high frequency signal produced by the oscillator stage 16 at an audible rate consists of a variable grid bias resistor 22 which is shown rotated by motor 23 through gear mechanism 24. When rotated, the resistor 22 varies the bias on the grid of R.F. oscillator tube 30 between a conducting and a cut-off condition and in this way modulates the signal produced in stage 16.

The R.F. oscillator and amplifier stages 16 and 18 have tuned inductive-capacitive tank circuits in which the capacitive elements 26 and 28 respectively are rotated by the motor 23 through the gear mechanism 24 to constantly change the frequency of the R.F. signal. In the usual situation, as when the present device is used to interfere with reception, the rotation of the capacitive elements 26 and 28 varies the tuning of the associated tank circuits so that the R.F. signal sweeps the whole broadcast band each revolution. It is contemplated, however, that the present device could also be constructed to sweep any desired range of frequencies and not be limited to sweeping the broadcast band.

It is usually desirable to mechanically couple the capacitors 26 and 28 in the tank circuits of the R.F. oscillator and R.F. amplifier stages 16 and 18 so that the tank circuits are always tuned to the same frequency at any given time. It is not necessary, however, that the audio modulation or interrupting signal be swept at the same rate as the radio frequency signal since the frequencies are wholly independent of each other. In the usual situation where it is desired to interfere with a radio signal but not to transmit a spoken message the audio signal is swept through its range about 20 times per minute and the radio frequency signal is swept through its range about 750 to 2,000 times per minute. If a spoken message is to be used to warn motorists, and others, instead of merely an alarm signal, then it is desirable that the audible modulation take place more rapidly by the use of electrical means as will be shown hereinafter.

The R.F. oscillator stage 16 consists of the triode vacuum tube 30 with its plate 32 connected to a D.C.

B+ supply through the upper portion of coil 34. The coil 34 is connected in parallel with the capacitor 26; and the combination, which forms the R.F. oscillator tank circuit, is connected in series with capacitor 36 and a parallel resistor-capacitor circuit of resistor 38 and capacitor 40 to the control grid 42. The variable resistor 22 which changes the bias on the grid 42 of tube 30 is connected at one end to ground and has a variable contact 52 which is connected to the resistor 38 and capacitor 40. The cathode 53 of tube 30 is grounded.

The output of stage 16 (taken from plate 32) is connected through capacitor 54 to the control grid 56 of vacuum tube 58. The grid 56 of tube 58 is biased to ground through a fixed resistor 60, and the plate 62 is connected to a tank circuit consisting of the variable capacitor 28 and inductor 64. D.C. plate voltage (B+) is supplied through the inductor 64, and D.C. bias is also supplied to the screen grid 66 through a resistor 68. The screeen grid 66 is also grounded through a capacitor 70. The suppressor grid 72 is connected to the cathode 74 and the combination is connected to ground through a parallel circuit consisting of resistor 76 and capacitor 78. The antenna 20 is connected to ground through a coil 80 which is electromagnetically coupled with the inductor 64.

If desired the screen grid 66 of tube 58 can also be connected to the plate 82 of another tube 84 which has a microphone 86 connected between its cathode 88 and ground. The microphone 86 is shunted by a capacitor 90, and the control grid 92 is grounded.

The block diagram of FIG. 3 shows a modified form of the present device in which a reactance tube stage 100 has been included to provide more rapid sweeping of the broadcast or other similar frequency band. The principal advantage obtained by increasing the frequency of the band sweep is that it increases the number of times that the transmitted radio frequency signal is tuned to each frequency in the band thereby increasing the number of times that the interfering signal can be introduced into each frequency or station in the band. This is particularly important when transmitting voice messages because the increased frequency of the interferences produces clearer more distinct messages by minimizing distortion due to the relatively short time constants of the circuits in most receiving sets. Since mechanical means are limited in frequency at which they can sweep the band it has been found desirable to use electronic means for this purpose when transmitting a voice message.

The modified device shown in FIGS. 3 and 4 performs much the same function as the device 12 shown in FIGS. 1–2 but is somewhat more complicated and uses a greater number of components to accomplish the more rapid sweep necessary for clear distinct voice transmission. The principal elements of the modified device are: an R.F. oscillator stage 102 (corresponding to the stage 16 in FIG. 1) which is swept over the broadcast band more rapidly than stage 16 because of the reactance tube stage 100 which replaces the mechanically varied capacitor 26; a multivibrator stage 104 which generates a square wave; an impedence matched cathode follower integrator 106 whose output time constant is long compared to the frequency of the input signal and therefore transforms the square wave into a triangular wave; another cathode follower stage 108 that gives the triangular wave the desired voltage level for driving the reactance tube stage 100; and the reactance tube stage 100 which acts as a frequency modulator to vary the frequency of the signal produced in the R.F. oscillator stage 102 over the broadcast or similar band. The reactance tube stage 100 is able to frequency modulate the output signal from the R.F. oscillator 102 over the entire range of frequencies very rapidly (in the order of 100 kilocycles per second) which means that the band will be swept at a rate approximately 200,000 times per second.

The frequency modulated R.F. output signal from the R.F. oscillator stage 102 is fed to a power amplifier stage 110 where it is amplitude modulated by a voice or other generated audio signal produced in a modulator 112 and then fed to antenna 114. The transmitted signal leaving the antenna 114 is in the form of a continuous R.F. carrier that is both frequency and amplitude modulated. This output signal differs from the signal produced by the device 12 because it is both frequency and amplitude modulated while the signal from the device 12 is frequency modulated and interrupted at an audio rate so that the signal is not continuous. Furthermore, modulating rates employed in the device 12 are produced mechanically instead of electrically, and therefore, have lower frequencies.

FIG. 4 shows a circuit diagram of the modified device for simultaneous frequency and amplitude modulating an R.F. signal so as to interfere with transmitted signals over the entire broadcast or other band. Tubes 116 and 118 and the circuits associated therewith correspond to the multi-vibrator stage 104; tube 120 and its circuit correspond to the cathode follower integrator stage 106; tube 122 and its circuits correspond to the cathode follower stage 108; tube 124 is the principal element in the reactance tube stage 100; tube 126 is the principal element in the R.F. oscillator stage 102; tube 128 is the principal element in the power amplifier stage 110; and tubes 130 and 132 and microphone 134 are the principal elements in the audio modulator stage 112.

*Operation*

The present device operates off of the power of the vehicle and may have its own built in power supply to convert the vehicle power to a usable form. It is also anticipated to provide a suitable switch (not shown) so that the vehicle may be operated with the alarm device 12 energized or deenergized.

When the alarm device 12 is energized and the vehicle is operating, the R.F. oscillator 16 produces a carrier signal that sweeps across the spectrum of radio frequencies at a rate dependant upon the speed of rotation of the capacitive element 26. The particular R.F. oscillator stage 16 shown in the drawings is of the well known Hartley construction although it is contemplated that other types of oscillators could have been employed equally well without departing from the spirit and scope of the invention.

The R.F. output from the Hartley oscillator is modulated at an audio rate by the variable resistor 22 which has its variable contact 52 operatively connected to the gear box 24. The variable resistor 22 is connected to the control grid 42 of the R.F. oscillator tube 30 and modulates the R.F. signal by varying the bias on the grid 42 at an audio rate.

The radio frequency output from the Hartley oscillator is constantly varied by rotating the capacitive element 26 of the tank circuit, and the output therefrom is fed to the grid 56 of the R.F. amplifier tube 58. The R.F. amplifier stage 18 operates in a conventional way to amplify the modulated input, and the output therefrom is fed from the tank circuit in the plate circuit of the tube 58 to the antenna 20. The capacitive element 28 in the plate tank circuit is mechanically coupled to the capacitive element 26 and is driven at the same speed as element 26 by the gear box 24. This is important because it keeps both of the tank circuits tuned to the same frequency at all times. In an actual construction the capacitive elements 26 and 28 are driven by a common shaft (not shown) to keep them synchronized.

The microphone 86 and its related circuit may be provided as an optional feature when it is desired to transmit specific verbal instructions through the device 12. The microphone circuit operates through the screen grid 66 of tube 58 and is used instead of the audio oscillator to modulate the R.F. carrier signal.

The signal that is transmitted from the antenna 20 is in the form of an audio modulated constantly changing radio frequency carrier. The strength of the signal, of course, can be varied depending upon the range and directivity desired. For emergency land vehicles such as police cars, ambulances, fire engines, and the like it is usually desirable to transmit the signal over a fairly limited area such as a four or five block area in a city without attempting to make the signal directional. For airplanes, boats, trains, etc. the distance can be extended and directivity may be more important.

In the case of emergency land vehicles where it is desired to interfere with the normal operation of automobile radios and the like the frequency range involved does not depend upon line of sight operation and the interference signal is effective over hills, around corners and through obstacles such as buildings, houses, and the like. A similar device using different size components could also be constructed to interfere on higher frequency signals such as those used in television and short wave sets.

It is apparent that there are many modifications, changes, variations and applications of the present device which suggest themselves from this disclosure.

Thus, it is apparent that there has been provided a novel device for use on emergency vehicles and the like which fulfills all of the objects and advantages sought therefor. Occupants of cars and other vehicles who are preoccupied listening to radios and the like will be alerted of an emergency situation requiring greater than usual care, and the device which does the alerting is relatively simple and inexpensive to construct and requires minimum attention by an operator. It is understood, however, that the foregoing specification and accompanying drawings have been presented only by way of illustration and example and that changes, alterations and modifications in the present disclosure which will be readily apparent to those skilled in the art are contemplated as within the scope of the invention which is limited only by the claims which follow.

What I claim is:

1. An alarm device for transmitting an emergency signal from an antenna comprising electrical means connected to the antenna for generating a signal and transmitting the signal from the antenna, said electrical means including a signal generator having a first frequency varying element associated therewith capable of varying the frequency of the generated signal over a preselected frequency range, amplifier means connected between the generator and the antenna for increasing the strength of the generated signal, said amplifier means including a second frequency varying element associated therewith and coupled to the first frequency varying element for continuously maintaining the same tuning for the amplifier means and for the generator, an audio modulating device connected to the amplifier means for modulating the frequency varying generated signal at an audible rate so that the audio frequency is transmitted on each frequency in the frequency range during each cycle of radio frequency operation, said modulating device including a third frequency varying element, and drive means operatively connected to the first, second, and third frequency varying elements for continuously changing the frequency of the generated signal and for modulating said signal at an audible rate.

2. A device for interfering with the reception of transmitted signals over a preselected range of frequencies to convey a message comprising an antenna, electrical means capable of generating an electrical signal connected to the antenna for transmitting the generated signal therefrom, said electrical means including a signal generator having a frequency varying element therein, drive means connected to said frequency varying element for changing the frequency of the generated signal over a preselected band of frequencies, means connected to said signal generator for interrupting the generated signal at an audible rate, said signal interrupting means including a voltage varying element operatively connected for movement by said drive means for producing a varying voltage to control the operation of the generator such that the generator is alternately switched between an operating and non-operating position at an audible rate.

3. An alarm device for use with emergency vehicles and the like comprising an antenna mounted on a vehicle, and electrical means capable of generating an electrical signal connected to the antenna for transmitting the generated signal therefrom, said electrical means including signal generator means having a frequency varying element associated therewith, said element being capable of changing the frequency of the generated signal over a selected frequency band, means for audio modulating the generated signal, and drive means operatively connected to said frequency varying element and to said audio modulating means, said drive means driving the frequency varying element to continuously change the frequency of the generated signal whereby said signal continuously sweeps the selected band at a rate such that all energized receivers within the range of the device regardless of the frequency to which they are tuned within said band are interrupted, and reproduce the audio modulation therein.

References Cited in the file of this patent

UNITED STATES PATENTS

| | | |
|---|---|---|
| 1,607,485 | Schmidt | Nov. 16, 1926 |
| 1,838,762 | Hammond | Dec. 29, 1931 |
| 2,303,493 | Purington | Dec. 1, 1942 |

FOREIGN PATENTS

| | | |
|---|---|---|
| 557,563 | Great Britain | Nov. 25, 1943 |